(12) United States Patent
Chin

(10) Patent No.: US 12,128,334 B2
(45) Date of Patent: Oct. 29, 2024

(54) FILTER PRESS WITH THREADABLY ADVANCED FILTRATE RECEIVING PLUNGER

(71) Applicant: Kin Mun Chin, Selangor (MY)

(72) Inventor: Kin Mun Chin, Selangor (MY)

( * ) Notice: Subject to any disclaimer, the term of this patent is extended or adjusted under 35 U.S.C. 154(b) by 49 days.

(21) Appl. No.: 18/161,910

(22) Filed: Jan. 31, 2023

(65) Prior Publication Data

US 2023/0201748 A1 Jun. 29, 2023

Related U.S. Application Data

(63) Continuation-in-part of application No. 16/451,729, filed on Jun. 25, 2019, now abandoned.

(30) Foreign Application Priority Data

Sep. 5, 2018 (MY) .......................... PI 2018703147

(51) Int. Cl.
*B01D 33/01* (2006.01)
*B30B 9/06* (2006.01)

(52) U.S. Cl.
CPC .......... *B01D 33/0183* (2013.01); *B01D 33/01* (2013.01); *B01D 33/015* (2013.01); *B01D 2201/307* (2013.01); *B01D 2201/4092* (2013.01); *B01L 2300/0681* (2013.01); *B01L 2400/0478* (2013.01); *B30B 9/06* (2013.01)

(58) Field of Classification Search
None
See application file for complete search history.

(56) References Cited

U.S. PATENT DOCUMENTS

| 26,229 | A | * | 11/1859 | Gatchell | A47J 31/20 99/287 |
| 63,090 | A | * | 3/1867 | Phillips | B30B 9/10 100/228 |
| 111,064 | A | * | 1/1871 | Hutchinson | B01D 3/00 100/70 R |
| 260,427 | A | * | 7/1882 | Smith | B30B 9/067 100/223 |
| 266,081 | A | * | 10/1882 | Berry | A01C 23/042 422/275 |
| 316,048 | A | * | 4/1885 | Mayo | F04B 39/042 100/269.18 |
| 608,268 | A | * | 8/1898 | Pelton | A23N 1/003 100/126 |
| 697,251 | A | * | 4/1902 | Hubbell | B30B 9/067 100/249 |

(Continued)

FOREIGN PATENT DOCUMENTS

| CN | 2253730 Y | 5/1997 |
| CN | 102834360 A | 12/2012 |

(Continued)

*Primary Examiner* — Robert J Popovics
(74) *Attorney, Agent, or Firm* — Patshegen IP; Moshe Pinchas

(57) ABSTRACT

A device and method for filtering a liquid, wherein the device (100) comprises a container (110), a filter unit (120) and a filtering medium (130). The container (110) holds the liquid (10) containing a solid substance (10a), and the filter unit (120) is slidable in the container (110). The filtering medium (130) is non-permeable to the solid substance (10a) in the liquid (10).

4 Claims, 12 Drawing Sheets

(56) References Cited

U.S. PATENT DOCUMENTS

| | | | | |
|---|---|---|---|---|
| 734,591 A * | 7/1903 | Morrissey et al. | B30B 9/067 | 100/269.18 |
| 755,126 A * | 3/1904 | Furst | B30B 15/08 | 100/238 |
| 762,690 A * | 6/1904 | Connell | B30B 9/067 | 210/396 |
| 769,015 A * | 8/1904 | Peirce | A47J 19/022 | 100/134 |
| 782,618 A * | 2/1905 | Minyard | A47J 19/02 | 100/130 |
| 1,187,118 A * | 6/1916 | Williamson | B30B 9/3064 | 100/255 |
| 1,386,340 A * | 8/1921 | Wuster | B01D 33/015 | 210/359 |
| 1,469,114 A * | 9/1923 | Simpson | B30B 9/06 | 100/228 |
| 1,512,644 A * | 10/1924 | Smith | B26D 3/185 | 83/435.16 |
| 1,535,769 A * | 4/1925 | Gallardo | B01D 11/0219 | 99/287 |
| 1,713,556 A * | 5/1929 | Ritchie | D06F 47/04 | 137/625.22 |
| 2,053,021 A * | 9/1936 | Cassol | A47J 31/20 | 99/287 |
| 2,139,542 A * | 12/1938 | Finlayson | D02G 1/12 | 8/114 |
| 2,362,154 A * | 11/1944 | Patrick | A01J 25/15 | 100/124 |
| 2,398,135 A * | 4/1946 | De La Roza, Sr. | D21C 9/18 | 210/357 |
| 2,427,446 A * | 9/1947 | De La Roza, Sr. | B30B 9/04 | 100/112 |
| 2,601,821 A * | 7/1952 | Johnson | A47J 31/02 | 99/287 |
| 2,602,596 A * | 7/1952 | Jones | A61J 7/0007 | 241/270 |
| 2,818,797 A * | 1/1958 | Ballor | A47J 19/06 | 100/238 |
| 2,826,138 A * | 3/1958 | Pexton | A47J 19/02 | 100/132 |
| 2,955,530 A * | 10/1960 | Nilo | G01N 1/286 | 600/573 |
| 3,482,700 A * | 12/1969 | Bebech | B01D 29/72 | 210/407 |
| 3,493,503 A * | 2/1970 | Mass | G01N 33/66 | 210/508 |
| 3,512,940 A * | 5/1970 | Shapiro | B01D 33/01 | 422/918 |
| 3,552,460 A * | 1/1971 | Cooney | A23G 7/0018 | 241/168 |
| 3,615,222 A * | 10/1971 | Mead | B01L 3/5082 | 436/826 |
| 3,705,100 A * | 12/1972 | Blatt et al. | A61M 1/3616 | 604/6.04 |
| 3,785,281 A * | 1/1974 | Ligh | B30B 15/068 | 100/269.18 |
| 3,796,316 A * | 3/1974 | Matz | B01D 29/52 | 100/116 |
| 3,802,843 A * | 4/1974 | Kim | B01D 33/01 | 422/537 |
| 3,870,639 A | 3/1975 | Moore et al. | | |
| 3,939,822 A * | 2/1976 | Markowitz | B01L 3/5021 | 604/190 |
| 3,941,317 A * | 3/1976 | Kanor | C12M 45/02 | 422/50 |
| 3,969,250 A * | 7/1976 | Farr | B01L 3/5021 | 422/918 |
| 3,995,544 A * | 12/1976 | Farley | A47J 43/286 | D7/665 |
| 4,035,150 A * | 7/1977 | Jaffe | G01N 33/726 | 436/66 |
| 4,070,280 A * | 1/1978 | Bray | B01D 63/10 | 210/450 |
| 4,288,316 A * | 9/1981 | Hennessy | B03B 7/00 | 209/173 |
| 4,303,412 A * | 12/1981 | Baikoff | B30B 9/06 | 44/589 |
| 4,312,343 A * | 1/1982 | LeVeen | A61M 5/31586 | 604/211 |
| 4,312,344 A * | 1/1982 | Nilson | A61M 5/2425 | 604/232 |
| 4,346,653 A * | 8/1982 | Rodak | B09B 3/20 | 100/249 |
| 4,348,950 A * | 9/1982 | Harris | A47J 19/06 | 241/168 |
| 4,350,768 A * | 9/1982 | Tihon | A01H 4/001 | 435/379 |
| 4,371,376 A * | 2/1983 | Dick, Jr. | B30B 9/265 | 44/636 |
| 4,374,474 A * | 2/1983 | Cain | G01N 9/04 | 73/433 |
| 4,387,633 A * | 6/1983 | Ballantyne | B30B 9/06 | 100/48 |
| 4,397,177 A * | 8/1983 | Cain | B30B 9/22 | 73/864.34 |
| D274,227 S * | 6/1984 | Cain | D23/209 | |
| 4,456,690 A * | 6/1984 | Cais | G01N 33/537 | 436/817 |
| 4,477,347 A * | 10/1984 | Sylva | B01D 61/18 | 210/232 |
| 4,501,539 A * | 2/1985 | Fenton, Jr. | B30B 9/06 | 425/84 |
| 4,537,123 A * | 8/1985 | Holcomb | A47J 19/06 | 99/510 |
| 4,580,577 A * | 4/1986 | O'Brien | A61B 10/0051 | 422/430 |
| 4,665,817 A * | 5/1987 | Simpson | B30B 9/06 | 100/249 |
| 4,676,154 A * | 6/1987 | Steinort | B30B 9/22 | 100/211 |
| 4,710,179 A * | 12/1987 | Haber | A61M 5/31595 | 604/211 |
| 4,714,205 A * | 12/1987 | Steinko | A47J 19/06 | 241/95 |
| 4,740,301 A * | 4/1988 | Lopez | B01D 61/08 | 210/321.87 |
| 4,800,020 A * | 1/1989 | Savas | B01D 33/01 | 422/535 |
| 4,810,249 A * | 3/1989 | Haber | A61M 5/31586 | 604/211 |
| 4,832,850 A * | 5/1989 | Cais | B01D 11/02 | 422/534 |
| 4,832,851 A * | 5/1989 | Bowers | B01D 61/18 | 422/534 |
| 4,859,336 A * | 8/1989 | Savas | B01D 29/90 | 422/535 |
| 4,891,134 A * | 1/1990 | Vcelka | G01N 33/491 | 422/918 |
| 4,897,193 A * | 1/1990 | Cais | B01D 63/08 | 422/534 |
| 4,958,557 A * | 9/1990 | Fiala | A01J 25/15 | 100/238 |
| 4,960,130 A * | 10/1990 | Guirguis | A61B 5/15003 | 600/584 |
| 4,961,432 A * | 10/1990 | Guirguis | B01L 3/5021 | 600/573 |
| 4,990,253 A * | 2/1991 | Vcelka | G01N 33/491 | 422/918 |
| 4,990,254 A * | 2/1991 | Toida | B01D 35/30 | 210/477 |
| 5,001,911 A * | 3/1991 | Eck | B30B 9/22 | 100/211 |
| 5,003,988 A * | 4/1991 | Guirguis | A61B 10/0045 | 604/404 |
| 5,024,237 A * | 6/1991 | Guirguis | G01N 33/54366 | 600/573 |

(56) References Cited

U.S. PATENT DOCUMENTS

| | | | | | |
|---|---|---|---|---|---|
| 5,038,046 | A | * | 8/1991 | Norman | G21G 4/08 |
| | | | | | 423/2 |
| 5,038,793 | A | * | 8/1991 | Guirguis | G01N 33/54366 |
| | | | | | 600/573 |
| 5,077,012 | A | * | 12/1991 | Guirguis | G01N 33/54366 |
| | | | | | 436/63 |
| 5,133,363 | A | * | 7/1992 | Guirguis | G01N 33/54366 |
| | | | | | 604/404 |
| 5,146,848 | A | * | 9/1992 | Dufour | B30B 9/321 |
| | | | | | 100/244 |
| 5,268,093 | A | * | 12/1993 | Hembree | C02F 1/50 |
| | | | | | 210/764 |
| 5,283,038 | A | * | 2/1994 | Seymour | A61B 10/0051 |
| | | | | | 600/573 |
| 5,303,640 | A | * | 4/1994 | Gaber | A47J 19/06 |
| | | | | | 100/234 |
| 5,320,031 | A | * | 6/1994 | Whitney | A47J 47/02 |
| | | | | | 99/458 |
| 5,358,690 | A | * | 10/1994 | Guirguis | B01L 3/508 |
| | | | | | 436/63 |
| 5,364,539 | A | * | 11/1994 | Castagno | B01D 29/60 |
| | | | | | 210/791 |
| 5,419,250 | A | * | 5/1995 | Ferguson | B30B 9/06 |
| | | | | | 100/910 |
| 5,478,586 | A | * | 12/1995 | Connor | A47J 31/20 |
| | | | | | 426/433 |
| 5,501,144 | A | * | 3/1996 | Bryson | A47J 43/286 |
| | | | | | 100/910 |
| 5,549,816 | A | * | 8/1996 | Harp | B01D 33/0183 |
| | | | | | 210/120 |
| 5,667,754 | A | * | 9/1997 | Brayton | G01N 1/405 |
| | | | | | 436/175 |
| 5,701,810 | A | * | 12/1997 | Nakai | A23L 11/45 |
| | | | | | 99/453 |
| 5,706,721 | A | * | 1/1998 | Homes | A47J 43/286 |
| | | | | | 99/506 |
| 5,786,227 | A | * | 7/1998 | Charlton | B01L 3/5021 |
| | | | | | 436/174 |
| 5,786,228 | A | * | 7/1998 | Charlton | A61B 10/0045 |
| | | | | | 73/64.56 |
| 5,833,860 | A | * | 11/1998 | Kopaciewicz | B01J 20/28033 |
| | | | | | 210/473 |
| 5,887,510 | A | * | 3/1999 | Porter | A47J 31/20 |
| | | | | | 99/287 |
| 5,902,481 | A | * | 5/1999 | Schwietert | A47J 43/24 |
| | | | | | 210/474 |
| 5,932,174 | A | * | 8/1999 | Brayton | B01L 3/502 |
| | | | | | 436/175 |
| 5,935,435 | A | * | 8/1999 | Hasler | B01D 29/23 |
| | | | | | 210/473 |
| 5,954,961 | A | * | 9/1999 | Carchidi | B01D 35/02 |
| | | | | | 210/455 |
| 5,981,293 | A | * | 11/1999 | Charlton | B01L 3/5021 |
| | | | | | 436/174 |
| 5,998,214 | A | * | 12/1999 | Guirguis | B01L 3/5021 |
| | | | | | 422/419 |
| 6,221,655 | B1 | * | 4/2001 | Fung | B01L 3/5021 |
| | | | | | 435/7.1 |
| 6,506,167 | B1 | * | 1/2003 | Ishimito | G01N 33/491 |
| | | | | | 600/577 |
| 6,561,080 | B1 | * | 5/2003 | Feeney | A47J 31/24 |
| | | | | | 99/295 |
| 6,602,717 | B2 | * | 8/2003 | Radmacher | G01N 33/1806 |
| | | | | | 436/124 |
| 6,604,454 | B1 | * | 8/2003 | Tateno | A47J 19/06 |
| | | | | | 241/169.1 |
| 6,606,939 | B1 | * | 8/2003 | Tateno | A47J 19/02 |
| | | | | | 241/169.1 |
| 6,634,869 | B2 | * | 10/2003 | Britz | F04B 53/20 |
| | | | | | 417/313 |
| 7,040,218 | B1 | * | 5/2006 | Biolchini, Jr. | A47J 31/20 |
| | | | | | 99/287 |
| 7,176,034 | B2 | * | 2/2007 | Efthimiadis | A61B 10/0096 |
| | | | | | 422/534 |
| 7,264,780 | B1 | * | 9/2007 | Sanner | A61B 10/0038 |
| | | | | | 422/565 |
| 7,648,088 | B2 | * | 1/2010 | Eikelenberg | A47J 43/255 |
| | | | | | 241/168 |
| 7,758,556 | B2 | * | 7/2010 | Perez-Cruet | A61M 1/79 |
| | | | | | 604/416 |
| 7,779,754 | B2 | * | 8/2010 | Souza | A47J 43/286 |
| | | | | | 99/506 |
| 7,790,117 | B2 | * | 9/2010 | Ellis | B01D 33/0125 |
| | | | | | 436/178 |
| 7,794,408 | B2 | * | 9/2010 | Binette | A61B 10/0096 |
| | | | | | 600/562 |
| 7,849,784 | B2 | * | 12/2010 | Adler | A47J 31/02 |
| | | | | | 99/287 |
| 7,926,137 | B2 | * | 4/2011 | Walters-Olaru | B67B 7/32 |
| | | | | | 7/110 |
| 8,177,968 | B2 | * | 5/2012 | Wang | C02F 1/002 |
| | | | | | 210/136 |
| 8,211,384 | B2 | * | 7/2012 | Ellis | B23P 11/02 |
| | | | | | 422/534 |
| 8,216,462 | B2 | * | 7/2012 | O'Brien | C02F 1/002 |
| | | | | | 210/94 |
| 8,234,971 | B2 | * | 8/2012 | Cerroni | A47J 31/38 |
| | | | | | 99/287 |
| 8,268,171 | B2 | * | 9/2012 | Liao | A61B 10/0038 |
| | | | | | 422/549 |
| 8,313,644 | B2 | * | 11/2012 | Harris | C02F 1/002 |
| | | | | | 210/205 |
| 8,318,011 | B2 | * | 11/2012 | O'Brien | C02F 1/002 |
| | | | | | 210/94 |
| 8,322,539 | B1 | * | 12/2012 | Ellis | B01D 33/0125 |
| | | | | | 436/178 |
| 8,323,490 | B1 | * | 12/2012 | Wright | B01D 29/25 |
| | | | | | 210/474 |
| 8,383,066 | B2 | * | 2/2013 | Ellis | B01D 33/0125 |
| | | | | | 422/534 |
| 8,394,268 | B2 | * | 3/2013 | O'Brien | C02F 1/002 |
| | | | | | 210/94 |
| 8,414,778 | B2 | * | 4/2013 | Tajima | B01L 3/0275 |
| | | | | | 422/534 |
| 8,425,771 | B2 | * | 4/2013 | O'Brien | C02F 1/002 |
| | | | | | 210/94 |
| 8,540,082 | B2 | * | 9/2013 | Kelland | B01L 3/50215 |
| | | | | | 210/515 |
| 8,562,542 | B2 | * | 10/2013 | Binette | A61B 10/0096 |
| | | | | | 600/562 |
| 8,623,641 | B2 | * | 1/2014 | Chen | C12M 47/12 |
| | | | | | 422/422 |
| 8,673,239 | B2 | * | 3/2014 | Niedbala | B01L 3/5023 |
| | | | | | 422/430 |
| 8,696,674 | B2 | * | 4/2014 | Howard | A61B 17/1635 |
| | | | | | 606/1 |
| 8,728,329 | B2 | * | 5/2014 | Ellis | B01L 3/5021 |
| | | | | | 422/534 |
| 8,770,047 | B2 | * | 7/2014 | Raadnui | G01N 3/56 |
| | | | | | 494/36 |
| 8,790,511 | B2 | * | 7/2014 | Yang | C02F 1/002 |
| | | | | | 210/85 |
| 8,828,223 | B2 | * | 9/2014 | Savage | B30B 9/047 |
| | | | | | 210/DIG. 8 |
| 8,845,605 | B2 | * | 9/2014 | Hensler | A61M 1/60 |
| | | | | | 604/319 |
| 8,920,393 | B2 | * | 12/2014 | Hensler | A61M 1/79 |
| | | | | | 604/319 |
| 8,925,734 | B2 | * | 1/2015 | Ellis | B01D 35/30 |
| | | | | | 422/534 |
| 8,978,896 | B2 | * | 3/2015 | Ellis | B01L 3/502 |
| | | | | | 436/178 |
| 8,992,861 | B2 | * | 3/2015 | Karkouche | C12M 47/02 |
| | | | | | 422/534 |
| 9,022,223 | B1 | * | 5/2015 | Wright | B01D 65/02 |
| | | | | | 210/413 |
| 9,034,044 | B2 | * | 5/2015 | Hensler | B65D 25/10 |
| | | | | | 623/17.11 |

(56) References Cited

U.S. PATENT DOCUMENTS

| | | | | |
|---|---|---|---|---|
| 9,144,773 | B2* | 9/2015 | Nahmani | B01D 65/00 |
| 9,179,798 | B2* | 11/2015 | Albanese | A47J 31/20 |
| 9,186,016 | B2* | 11/2015 | Richardson | A47J 31/20 |
| 9,193,587 | B2* | 11/2015 | Bennett | C02F 1/44 |
| 9,333,447 | B2* | 5/2016 | McKay | B01D 33/0158 |
| 9,409,165 | B2* | 8/2016 | Ellis | B01L 3/5082 |
| 9,510,705 | B2* | 12/2016 | Rolfes | A47J 31/38 |
| 9,526,368 | B2* | 12/2016 | Sacks | A47J 31/0605 |
| 9,532,681 | B2* | 1/2017 | Savage | B30B 9/047 |
| 9,591,942 | B2* | 3/2017 | Chiu | A47J 31/005 |
| 9,636,235 | B2* | 5/2017 | Hensler | A61F 2/4601 |
| 9,648,976 | B2* | 5/2017 | Scott | A47J 31/02 |
| 9,707,319 | B2* | 7/2017 | Geppert | A61B 17/8827 |
| 9,822,341 | B2* | 11/2017 | Howard | A61M 1/79 |
| 9,828,273 | B2* | 11/2017 | Barlow | B01D 61/145 |
| 9,833,572 | B2* | 12/2017 | Berend | A61M 5/19 |
| 9,835,531 | B2* | 12/2017 | Huemer | G01N 1/4077 |
| 9,861,225 | B1* | 1/2018 | Sacks | A47J 31/0621 |
| 9,872,944 | B1* | 1/2018 | Willard | A61M 1/631 |
| 9,873,627 | B1* | 1/2018 | Barlow | B01D 63/024 |
| 9,878,289 | B2* | 1/2018 | Pierik | C02F 1/002 |
| 9,919,248 | B2* | 3/2018 | Tortorella | B01L 3/502 |
| 10,034,569 | B2* | 7/2018 | Khalifa | A47J 31/20 |
| 10,040,063 | B2* | 8/2018 | Scagliarini | B01L 3/502 |
| 10,126,215 | B2* | 11/2018 | Stern | B30B 9/06 |
| 10,226,147 | B2* | 3/2019 | Harper | A47J 31/043 |
| 10,302,535 | B2* | 5/2019 | Gellibolian | B01L 3/502 |
| 10,369,500 | B2* | 8/2019 | Dominguez | A61L 27/3604 |
| 10,433,674 | B2* | 10/2019 | Savage | B30B 9/067 |
| 10,448,779 | B2* | 10/2019 | Kalbfleisch | A47J 31/20 |
| 10,493,183 | B2* | 12/2019 | Hensler | A61M 1/60 |
| 10,588,678 | B2* | 3/2020 | Mckay | B01D 33/0158 |
| 10,694,883 | B2* | 6/2020 | Harper | A47J 31/043 |
| 10,702,629 | B2* | 7/2020 | Pilkington | A61M 5/2448 |
| 10,710,007 | B2* | 7/2020 | Weston | B01D 33/42 |
| 10,717,249 | B1* | 7/2020 | Kim | A23P 30/10 |
| 10,775,280 | B2* | 9/2020 | Stern | G01N 1/10 |
| 10,830,677 | B2* | 11/2020 | Gellibolian | B01L 3/5021 |
| 10,913,060 | B2* | 2/2021 | Jones | B01L 3/502 |
| 10,927,347 | B2* | 2/2021 | Pilkington | A61M 1/892 |
| 10,960,114 | B2* | 3/2021 | Goisis | A61M 1/029 |
| 11,014,827 | B2* | 5/2021 | Weber | C02F 1/008 |
| 11,045,036 | B2* | 6/2021 | Khalifa | B65D 85/72 |
| 11,160,916 | B2* | 11/2021 | Hensler | A61M 1/60 |
| 11,179,657 | B2* | 11/2021 | Weston | B01D 33/01 |
| 11,297,971 | B2* | 4/2022 | Harper | A47J 31/20 |
| 11,330,930 | B2* | 5/2022 | Pranckun | A47J 31/043 |
| 11,382,448 | B1* | 7/2022 | Crane | B01D 29/6476 |
| 11,426,682 | B2* | 8/2022 | Merrigan | C02F 1/003 |
| 11,497,343 | B2* | 11/2022 | Kuempel | A47J 31/0605 |
| 11,577,238 | B2* | 2/2023 | Fruchter | C12Q 1/14 |
| 11,596,882 | B2* | 3/2023 | Mueller | C02F 1/003 |
| 11,638,891 | B2* | 5/2023 | Chung | B01D 33/01 210/780 |
| 11,680,877 | B2* | 6/2023 | Fruchter | G01N 1/4077 435/5 |
| 11,697,114 | B2* | 7/2023 | Olson | B01D 21/26 436/45 |
| 11,707,153 | B2* | 7/2023 | Ewing | B30B 9/06 99/287 |
| 11,812,890 | B2* | 11/2023 | Backstrom | A47J 31/446 |
| 11,825,974 | B1* | 11/2023 | Murphy | A47J 19/005 |
| 11,890,614 | B2* | 2/2024 | Fruchter | A61B 10/0051 |
| 11,921,018 | B2* | 3/2024 | Feldman | G01N 1/2205 |
| 11,944,921 | B2* | 4/2024 | Weston | B01D 33/42 |
| 2004/0018120 | A1* | 1/2004 | Rappin | B01L 3/502 436/86 |
| 2004/0018575 | A1* | 1/2004 | Rappin | G01N 1/286 435/7.92 |
| 2005/0199129 | A1* | 9/2005 | Glucksman | A47J 31/20 99/279 |
| 2006/0052760 | A1* | 3/2006 | Batzdorf | A61M 1/79 604/319 |
| 2006/0093524 | A1* | 5/2006 | Sanner | B01L 3/502 422/63 |
| 2006/0260471 | A1* | 11/2006 | Adler | A47J 31/32 99/279 |
| 2007/0028779 | A1* | 2/2007 | Pigliacampo | A47J 31/20 99/297 |
| 2007/0137494 | A1* | 6/2007 | Wilhite | A47J 31/20 99/279 |
| 2007/0284300 | A1* | 12/2007 | Bidlingmeyer | G01N 1/4077 210/473 |
| 2007/0299363 | A1* | 12/2007 | Wong | A61B 10/0038 600/562 |
| 2008/0057505 | A1* | 3/2008 | Lin | G01N 33/54346 435/7.25 |
| 2009/0007937 | A1* | 1/2009 | Chen | B01L 3/502 134/10 |
| 2009/0229472 | A1* | 9/2009 | Ferrara, Jr. | A47J 31/18 99/323 |
| 2009/0238725 | A1* | 9/2009 | Ellis | B01L 3/502 29/700 |
| 2009/0294385 | A1* | 12/2009 | Tajima | B01L 3/0275 210/101 |
| 2010/0005979 | A1* | 1/2010 | Baccetti | A47J 31/38 99/287 |
| 2010/0093551 | A1* | 4/2010 | Montagu | G01N 33/493 210/120 |
| 2010/0102002 | A1* | 4/2010 | O'Brien | C02F 1/002 210/228 |
| 2010/0187183 | A1* | 7/2010 | Nelson | C02F 1/002 210/741 |
| 2010/0224078 | A1* | 9/2010 | Khalifa | A47J 31/20 99/323 |
| 2010/0255484 | A1* | 10/2010 | Halverson | G01N 1/38 435/6.1 |
| 2010/0275785 | A1* | 11/2010 | Weissman | A47J 31/20 99/287 |
| 2011/0056385 | A1* | 3/2011 | McLean | A47J 31/20 99/297 |
| 2011/0062153 | A1* | 3/2011 | Wang | C02F 1/002 220/23.86 |
| 2011/0159533 | A1* | 6/2011 | Karkouche | C12M 47/02 210/259 |
| 2011/0168644 | A1* | 7/2011 | Harris | C02F 1/002 210/236 |
| 2011/0177931 | A1* | 7/2011 | Kelland | B01L 3/50215 494/36 |
| 2011/0313143 | A1* | 12/2011 | Martin | G01N 30/6091 422/534 |
| 2012/0018361 | A1* | 1/2012 | Nakamura | B30B 9/327 210/232 |
| 2012/0037563 | A1* | 2/2012 | Liao | C12Q 1/24 210/416.1 |
| 2012/0292238 | A1* | 11/2012 | Wright | B01D 29/25 210/257.2 |
| 2012/0330220 | A1* | 12/2012 | Hensler | A61M 1/60 604/319 |
| 2013/0001143 | A1* | 1/2013 | Nelson | A23L 2/72 210/136 |
| 2013/0130401 | A1* | 5/2013 | Kanda | G01N 1/405 422/534 |
| 2013/0228534 | A1* | 9/2013 | Ellis | B01L 3/5021 210/808 |
| 2014/0008310 | A1* | 1/2014 | Weston | B01D 29/60 210/120 |
| 2014/0008311 | A1* | 1/2014 | Weston | B01D 29/60 210/120 |
| 2014/0023567 | A1* | 1/2014 | Ellis | B01L 3/5021 422/534 |
| 2014/0110356 | A1* | 4/2014 | McKay | A61F 2/28 210/402 |
| 2015/0076069 | A1* | 3/2015 | Ellis | B01L 3/502 210/663 |
| 2015/0093362 | A1* | 4/2015 | Dominguez | B01D 33/00 210/329 |
| 2015/0153258 | A1* | 6/2015 | Huemer | G01N 33/491 210/780 |

(56) References Cited

U.S. PATENT DOCUMENTS

| | | | |
|---|---|---|---|
| 2016/0069781 A1* | 3/2016 | Middlebrook | B02C 19/08 241/38 |
| 2016/0206818 A1* | 7/2016 | Berend | A61M 5/3129 |
| 2016/0220991 A1* | 8/2016 | Scagliarini | B01L 3/502707 |
| 2016/0333305 A1* | 11/2016 | Pilkington | C12M 45/02 |
| 2017/0318856 A1* | 11/2017 | Kittow | A23P 30/10 |
| 2017/0368226 A1* | 12/2017 | Pilkington | A61M 5/31513 |
| 2018/0192809 A1* | 7/2018 | Harper | A47J 31/043 |
| 2018/0303983 A1* | 10/2018 | Goisis | A61M 1/02 |
| 2019/0200801 A1* | 7/2019 | Harper | A47J 31/043 |
| 2019/0381498 A1* | 12/2019 | Fruchter | A61B 10/0051 |
| 2020/0070071 A1* | 3/2020 | Chin | B01D 29/90 |
| 2020/0338480 A1* | 10/2020 | Weston | B01D 33/01 |
| 2020/0397179 A1* | 12/2020 | Harper | A47J 31/20 |
| 2021/0102876 A1* | 4/2021 | Fruchter | G01N 1/4077 |
| 2021/0162102 A1* | 6/2021 | Hensler | A61M 1/79 |
| 2021/0215585 A1* | 7/2021 | Fruchter | B01L 3/502 |
| 2021/0291159 A1* | 9/2021 | Toda-Peters | B01L 3/502715 |
| 2022/0143532 A1* | 5/2022 | Weston | B01D 33/42 |
| 2022/0265081 A1* | 8/2022 | Ewing | A47J 31/0636 |
| 2023/0097082 A1* | 3/2023 | Muckenhuber | A47J 31/06 99/279 |
| 2023/0111922 A1* | 4/2023 | Fruchter | C12Q 1/14 435/5 |
| 2023/0182128 A1* | 6/2023 | Fruchter | B01L 3/502 435/5 |
| 2023/0201748 A1* | 6/2023 | Chin | B01L 3/5635 210/348 |
| 2023/0233964 A1* | 7/2023 | Merrigan | B01D 33/0116 210/780 |
| 2023/0266213 A1* | 8/2023 | Fruchter | G01N 1/4077 435/5 |
| 2023/0405498 A1* | 12/2023 | Weston | B01D 33/0116 |
| 2024/0091682 A1* | 3/2024 | Weston | B01D 29/60 |
| 2024/0131507 A1* | 4/2024 | Fruchter | B01L 3/502 |
| 2024/0139657 A1* | 5/2024 | Weston | B01D 29/60 |

FOREIGN PATENT DOCUMENTS

| | | | | |
|---|---|---|---|---|
| CN | 105568942 A | 5/2016 | | |
| CN | 107599476 A | 1/2018 | | |
| CN | 207591401 U | 7/2018 | | |
| DE | 112019004448 T5 * | 5/2021 | | B01D 25/12 |
| EP | 2268252 B1 | 1/2011 | | |
| JP | 1995-313813 A | 12/1995 | | |
| JP | 2014-507258 A | 3/2014 | | |
| WO | 2015078100 A1 | 6/2015 | | |
| WO | 2016208752 A1 | 12/2016 | | |
| WO | WO-2020050708 A1 * | 3/2020 | | B01D 25/12 |

* cited by examiner

FILTER PRESS WITH THREADABLY ADVANCED FILTRATE RECEIVING PLUNGER

CROSS REFERENCE TO RELATED APPLICATIONS

This application is a continuation of U.S. patent application Ser. No. 16/451,729, filed Jun. 25, 2019, entitled "DEVICE FOR FILTERING" which claimed priority to and the benefit of Malaysian Patent No. P12018703147, entitled "DEVICE FOR FILTERING", filed Sep. 5, 2018, both of which are hereby incorporated by reference in their entireties.

FIELD OF THE DISCLOSURE

The present disclosure relates to liquid filtration, in particular to a device and method for filtering a liquid and holding the filtrate separately.

BACKGROUND

In the modern medical world, it has become an increasing importance to analyze a physiological fluid e.g. blood, urine and the like. For this purpose, it is necessary to separate or filter one or more solid substances from the fluid.

Two different conventional arrangements for filtering the liquid are shown in FIGS. 7a-7b. In FIG. 7a, a typical filtration approach is explained, wherein the liquid is held in an upper container (20) which has a filtering medium (40) and a plunger (50). The plunger (50) exerts a pressure on the liquid. As the filtering medium (40) is only permeable to a liquid (10), a solid substance (10a) contained in the liquid (10) is retained in the upper container (20), while the liquid (10) passes through the filtering medium (40) and gets collected in a lower container (30). However, there is a high chance for the solid substance (10a) to form a blocking layer on top of the filtering medium (40). Therefore, there is a need for the plunger (50) to exert an external pressure to force the liquid (10) to pass through the solid substance (10) and the filtering medium (40).

In FIG. 7b, a reverse-filtration approach is explained, wherein a lower container (30) holds the liquid, and an upper container (20) is configured as a syringe with a plunger (50) and a filtering medium (40) in an outlet at an open bottom of the upper container (20). During filtration, the outlet is dipped into the liquid in the lower container (30). As the plunger (50) is raised, a liquid (10) passes through the filtering medium and gets collected in the top container (20), while a solid substance (10a) settles at a bottom of the lower container (30). Even though this arrangement is effective in minimizing clogging, transferring the collected liquid (10) from the upper container (20) to another container is difficult and therefore needs special arrangements therefor. Further, there is a high chance for the liquid (10) getting retained in the lower container (30).

Numerous modern systems have been developed to separate the components in the liquid. For example, centrifugation is a technique to separate components from a solution by applying a centrifugal force according to their size, shape, density, viscosity of the medium and rotor speed. In this method, two miscible substances can be separated and hydrodynamic properties of macromolecules can be analyzed.

U.S. Pat. No. 4,154,690 A discloses a device for use in centrifugal separation of components of a liquid. The device includes a separator element slidable within a cylindrical container containing the liquid. As the container is subjected to centrifugation, a portion of the container in contact with the separator element flexes to allow the liquid to pass through a space between the separator element and the flexed portion and to enable the separator element to slide towards a bottom of the container.

U.S. Pat. No. 4,154,690 A discloses a filtering device for separating particles from liquids. The device comprises a container for containing the liquid and a hollow piston slidable inside the container for separating the particles. An aperture is formed in the piston to allow the liquid to enter the piston during the filtering process, wherein a filtering material is disposed in the aperture.

PCT Patent Application No.: PCT/DK2010/050056 discloses a device for extracting a sample from a collection media with an increased yield compared to the centrifugation technique. After centrifugation, a solution is subjected through two or more filtering processes for separating the sample from the collection medium. There is, nevertheless, a continuing interest in providing improved and alternative devices to those which are presently generally available.

There is therefore a need in the art for a device for filtering a liquid and holding the filtrate in a simple, efficient and cost-effective way. There is also a need for a device for filtering a liquid without a need for any powered actuator for applying a pressure for filtering, while minimizing clogging of a filtering medium.

SUMMARY

The present disclosure proposes a device and method for filtering a liquid and holding filtrate in a simple, efficient and cost-effective way. The device does reverse-filtration without using any powered actuator for applying a pressure for filtering, while minimizing clogging of a filtering medium.

The device comprises a container, a filter unit and a filtering medium. The container holds the liquid, wherein the liquid contains at least one solid substance and is formed with a first fastening part. The filter unit is axially slidable in the container and is formed with a second fastening part matching with the first fastening part. At least a portion of an outer side surface of the filter unit is frictionally axially slides over an inner side surface of the container and forms an air-tight seal with the inner side surface of the container, when the filter unit is slid in the container.

The filtering medium is non-permeable to the solid substance in the liquid and is provided at a bottom end of the filter unit, such that when the filtering medium is being urged into the container, the liquid passes through the filtering medium and enters the filter unit, while the solid substance is retained in the container.

The fastening parts are configured as screw threads capable of locking the filter unit at different depths with respect to the container and capable of converting rotational motion/force into linear motion/force such that a screwing action of the first and second fastening parts with respect to one another urges the filter unit into the container in a controlled manner such that pressure required for filtering the liquid is exerted by the screwing action.

Preferably, the filtering medium is removably attached to a bottom of the filter unit. Alternatively, the filtering medium is formed as the bottom end of the filter unit.

Preferably, an inner diameter of a lower portion of the container is at least equal to an outer diameter of the bottom end of the filter unit, such that the bottom end of the filter unit frictionally, axially slides within the inner side surface of the lower portion of the container and forms the air-tight seal with the inner side surface of the container, when the filter unit is urged into the lower portion of the container.

The filtering medium is urged into the container by a sliding motion of the filter unit into the container.

In one embodiment, at least one marking is engraved on an inner side surface of the filter unit.

Various objects, features, aspects and advantages of the inventive subject matter will become more apparent from the following detailed description of preferred embodiments, along with the accompanying drawing figures in which like numerals represent like components.

BRIEF DESCRIPTION OF THE ACCOMPANYING DRAWINGS

In the figures, similar components and/or features may have the same reference numerals. Further, various components of the same type may be distinguished by following the reference numerals with a second numeral that distinguishes among the similar components. If only the first reference numeral is used in the specification, the description is applicable to any one of the similar components having the same first reference numeral irrespective of the second reference numeral.

DETAILED DESCRIPTION

Figure 1:
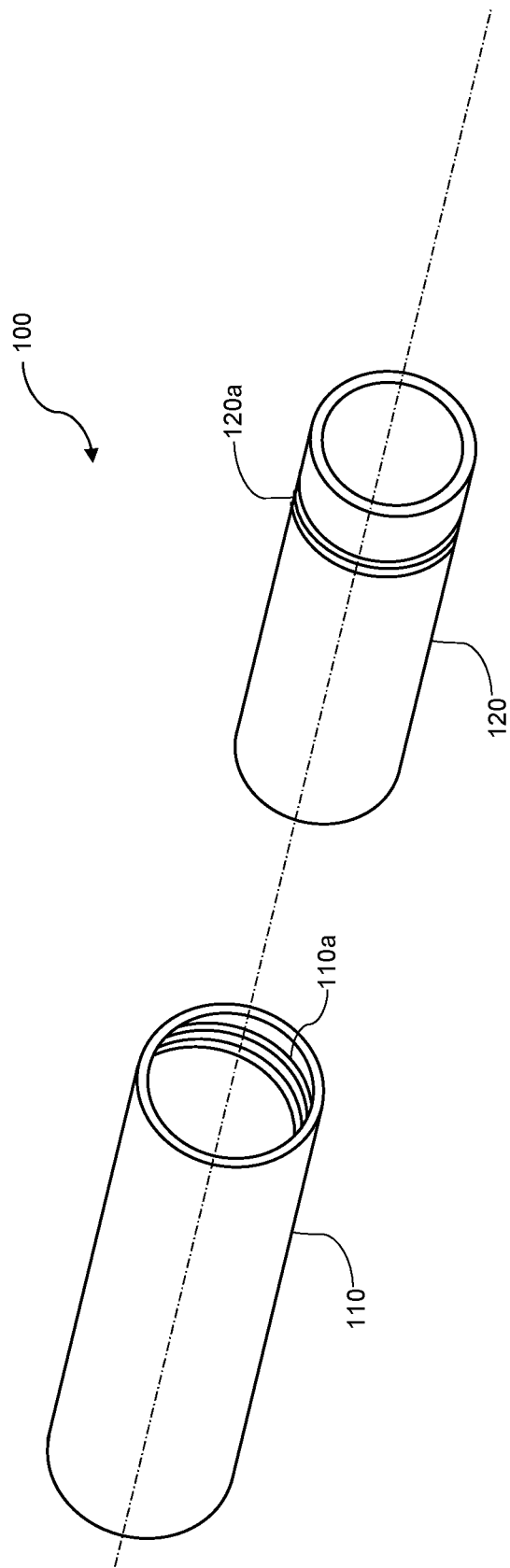
FIG. 1 illustrates an exploded perspective view of the device, in accordance with a first embodiment of the present invention.

In accordance with the present disclosure, there is provided a device for filtering a liquid, which will now be described with reference to the embodiments shown in the accompanying drawings. The embodiments do not limit the scope and ambit of the disclosure. The description relates purely to the embodiments and suggested applications thereof.

The embodiments herein and the various features and advantageous details thereof are explained with reference to the non-limiting embodiment in the following description. Descriptions of well-known components and processes are omitted so as to not unnecessarily obscure the embodiments herein. The examples used herein are intended merely to facilitate an understanding of ways in which the embodiments herein may be practiced and to further enable those of skill in the art to practice the embodiment herein. Accordingly, the description should not be construed as limiting the scope of the embodiment herein.

The description hereinafter, of the specific embodiment will so fully reveal the general nature of the embodiments herein that others can, by applying current knowledge, readily modify or adapt or perform both for various applications such specific embodiment without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Various terms as used herein are defined below. To the extent a term used in a claim is not defined below, it should be given the broadest definition persons in the pertinent art have given that term as reflected in printed publications and issued patents at the time of filing.

Definitions

Filtering: A process of separating a component from another component or from a mixture of multiple components.

Reverse-filtration: A process of forcing a filtrate to move in a direction other than the direction of gravity.

Solid substance: Any natural or synthetic substance in solid, or powder form.

The present disclosure relates to a device. Those skilled in the art would appreciate that various embodiments of the present disclosure enable. Embodiments herein enable filtering the liquid and holding the filtrate in a simple, efficient and cost-effective way without a need for any powered actuator e.g. pump, for applying a pressure for filtering, while minimizing clogging of a filtering medium.

The present invention does reverse-filtration, wherein the filtrate is made to pass through the filtering medium in a direction other than the direction of gravity while pushing the residue in an opposite direction, and therefore chances of clogging in the filtering medium is minimized without compromising with filtrate quality. Further, pressure required for filtering the liquid is exerted from the fastening action, thus filtering and collecting the filtrate in the filter unit simultaneously, while preventing re-mixing of the filtrate with the residue sandwiched between the container and the filter unit.

Referring to the accompanying drawings, FIG. 1 illustrates an exploded perspective view of the device, in accordance with a first embodiment of the present invention. The device (100) comprises a container (110) and a filter unit (120) axially slidable in the container (110). The two container (110) and the filter unit (120) are formed of a solid material e.g. plastics, metal, ceramic material, cellulose fibers and the like.

Figure 2:
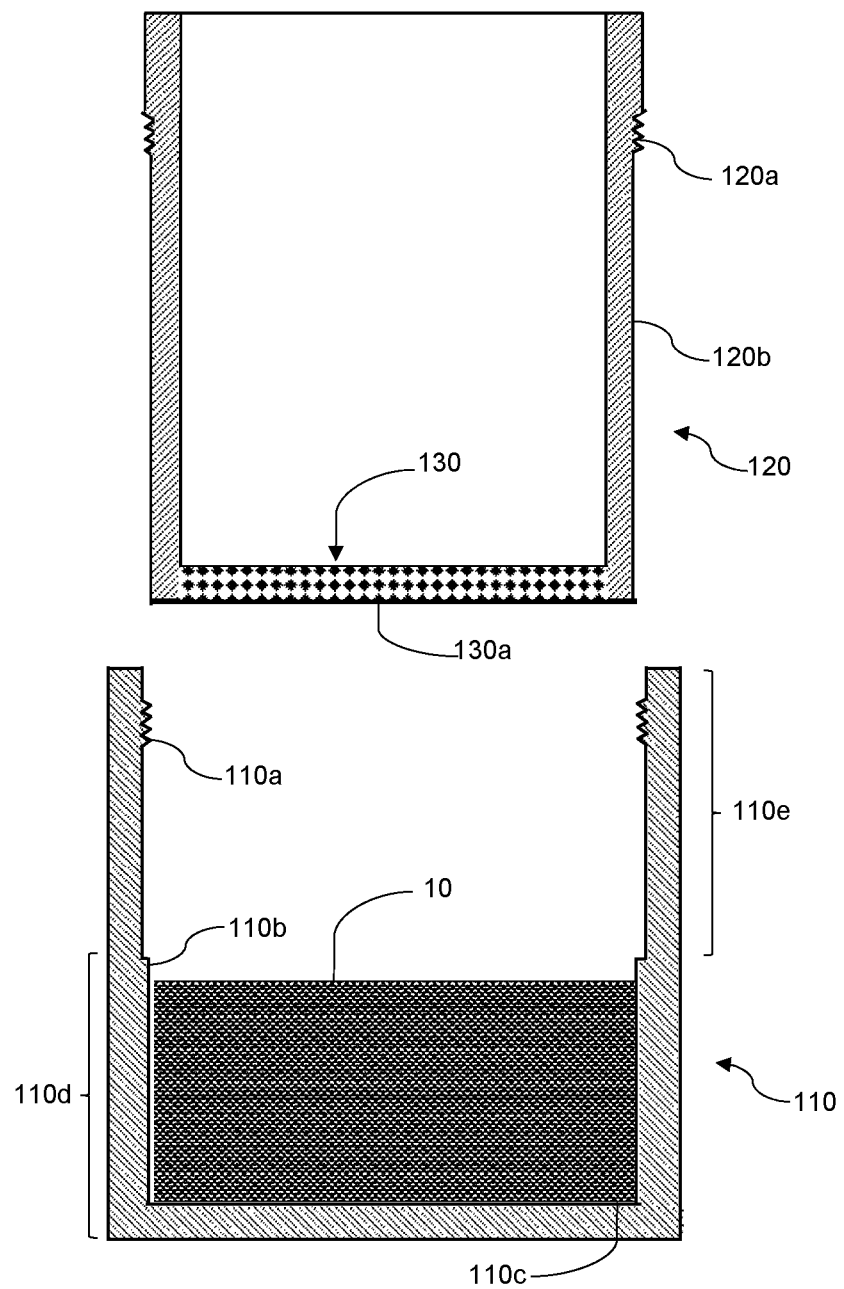
FIG. 2 illustrates an exploded longitudinal sectional view of the device, in accordance with a first embodiment of the present invention.
Figure 3:
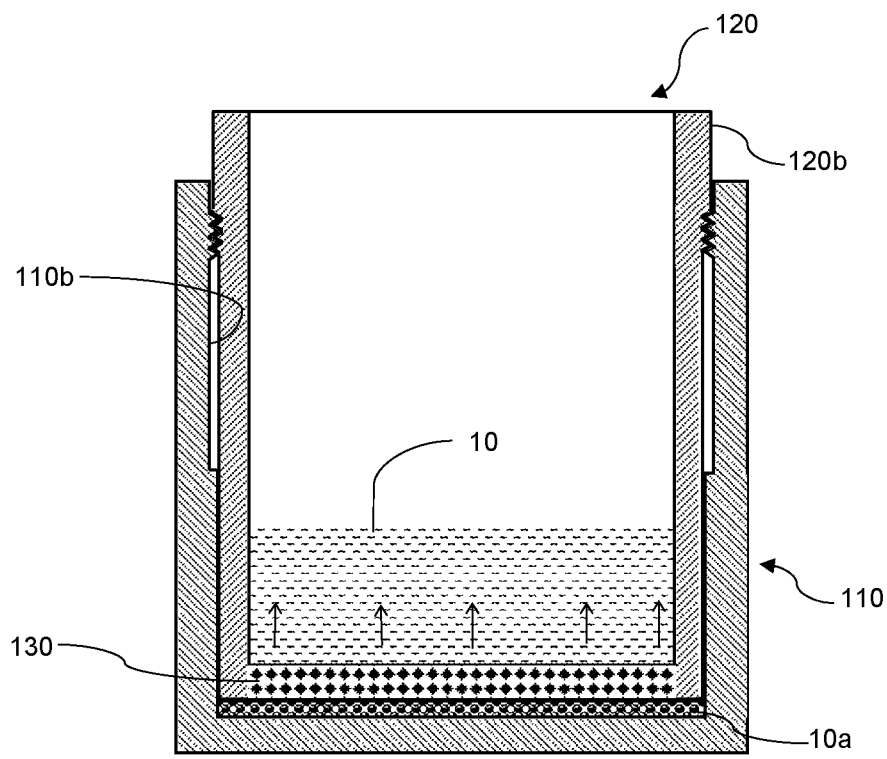
FIG. 3 illustrates a longitudinal sectional view of the device while in use, in accordance with a first embodiment of the present invention.

As shown in FIG. 2, the container (110) holds the liquid (10) containing at least one solid substance (10a, shown in FIG. 3). The liquid (10) can be any bodily liquid like blood, urine, milk, tears, mucus, saliva, semen, sweat, pus, etc. In an alternate embodiment, the liquid may be water, beverage, oil, chemical composition, food item, drug and the like. The beverage includes but not limited to coffee, tea, juice, soup, alcoholic beverage, carbonated beverage, etc.

A filtering medium (130) is provided at a bottom of the filter unit (120), wherein the filtering medium (130) is non-permeable to the solid substance (10a, shown in FIG. 3) in the liquid (10). The filtering medium (130) may be a single layer filtering medium such as a sieve, porous membrane, etc., a multi-layer porous filter package such as a filter media disclosed in U.S. Pat. No. 8,679,218 B2, or any other commercially available filter media. In a multi-layer filter package, each layer has at least one pore or hole, and the layers are arranged such that pores or holes of each layer is smaller than those of an immediate bottom layer. The filtering medium (130).

In an exemplary embodiment, the filtering medium (130) is formed as a bottom wall of the filter unit (120). However, in another embodiment, the filtering medium (130) may be removably attached to a bottom wall of the filter unit (120). Further, the filtering medium (130) may be removably attached to a top or bottom of the bottom wall of the filter unit (120).

The container (110) includes a first fastening part (110a), and the filter unit (120) includes a second fastening part (120a) matingly engageable with the first fastening part (110a). In an exemplary embodiment, the fastening parts (110a, 120a) are screw threads, and the container (110) and the filter unit (120) can be fastened to one another by a screwing action. Since the screw threads are capable of converting a rotational movement/force into a linear movement/force, a rotational movement of the filter unit (120) with respect to the container (110) is converted into a controlled lowering/raising of the filter unit (120) with respect to the container (110). Similarly, a rotational force applied to the filter unit (120) is converted into a translation force for pressurizing the liquid to force the liquid to pass through the filtering medium (130) and enter the filter unit (120), while constricting the solid substance (10a) between the filter unit (120) and the container (110).

While filtering, the liquid (10) is collected in the container (110) and the bottom of the filter unit (120) is inserted into the container (110) until the screw threads come in contact with one another. Then, the filter unit (120) is rotated with respect to the container (110) for further lowering the bottom of the filter unit (120) into the container (110) until the further lowering of the filter unit (120) is stopped by the solid substance (10a) or bottom of the container (110). By this way, this embodiment (with screw threads) is capable of completely separating the liquid and the solid substance in a controlled manner irrespective of a volume of liquid (10) and solid substance (10a) in the container (110). Furthermore, the screw threads are capable of holding the filter unit (120) in position with respect to the container (110) when the rotational force is not applied, and therefore prevention of re-mixture of the liquid (10) and the solid substance (10a) after separation is ensured, while enabling locking and sealing of the filter unit (120) at different depths with respect to the container (120).

Since the screw threads allow the filter unit (120) to be lowered into the container (120) until the bottom of the filter unit (120) hits the bottom of the container (120) or the solid substance (10a) is squeezed between the filter unit (120) and the container (120), this embodiment easily achieves height compatibility between the filter unit (120) and the container (110), while avoiding a need for precisely forming the screw threads at desired heights, and therefore achieving complete separation using a simple and cost-effective device.

Optionally, one or more markings e.g. lines, symbols, letters, numbers, etc., are engraved on an inner surface of the filter unit (120) to allow a user to easily measure a volume of liquid being filtered. Thereby, a user can stop urging the filter unit (120) into the container (110) when the liquid in the filter unit (120) reaches a desired volume, so as to retain the remaining liquid in the container (110) to be unfiltered.

In other embodiments, the fastening parts (110a, 120a) can also be formed as other mechanical fasteners e.g. snap-fit fastener, press-fit fastener, hook and loop fastener and the like.

Figure 4:
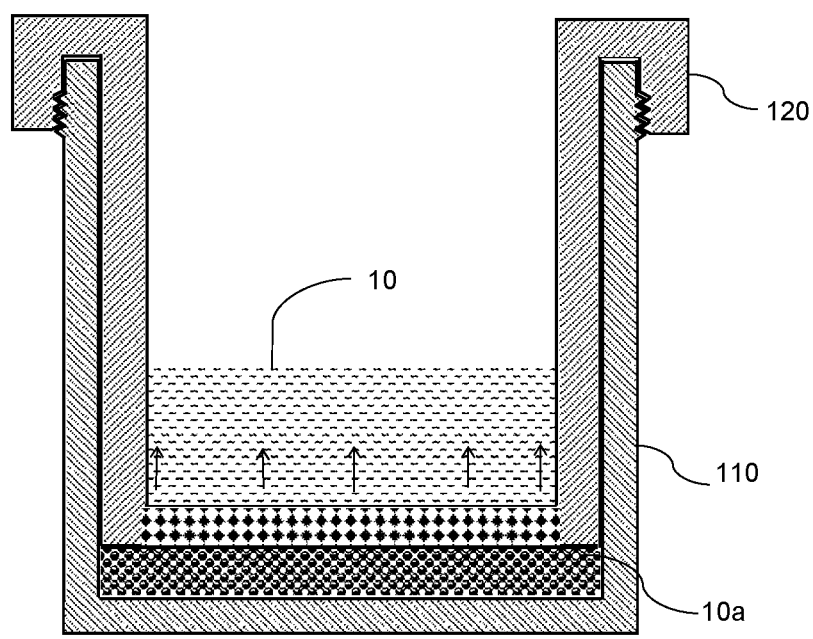
FIG. 4 illustrates a longitudinal sectional view of the device while in use, in accordance with a first embodiment of the present invention.

In the first embodiment, the first fastening part (110a) is formed on an inner side surface (110b) of the container (110), and the second fastening part (120a) is formed on an outer side surface (120b) of the filter unit (120). However, both the fastening parts (110a, 120a) may also be formed on outer side surfaces of the container (110) and the filter unit (120), as shown in FIG. 4, with a lip portion of the filter unit (120) inverted, so that the fastening parts (110a, 120a) are in line with one another, when the filter unit (120) is slid into the container (110).

Figure 5:
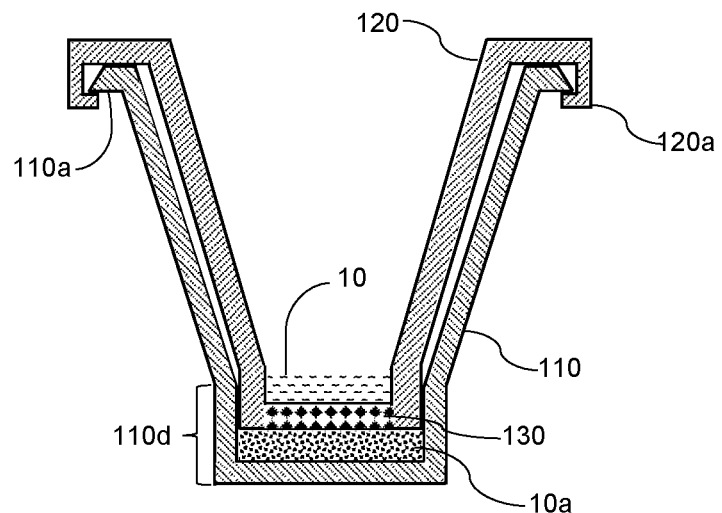
FIG. 5 illustrates a longitudinal sectional view of the device while in use, in accordance with a first embodiment of the present invention.
Figure 6:
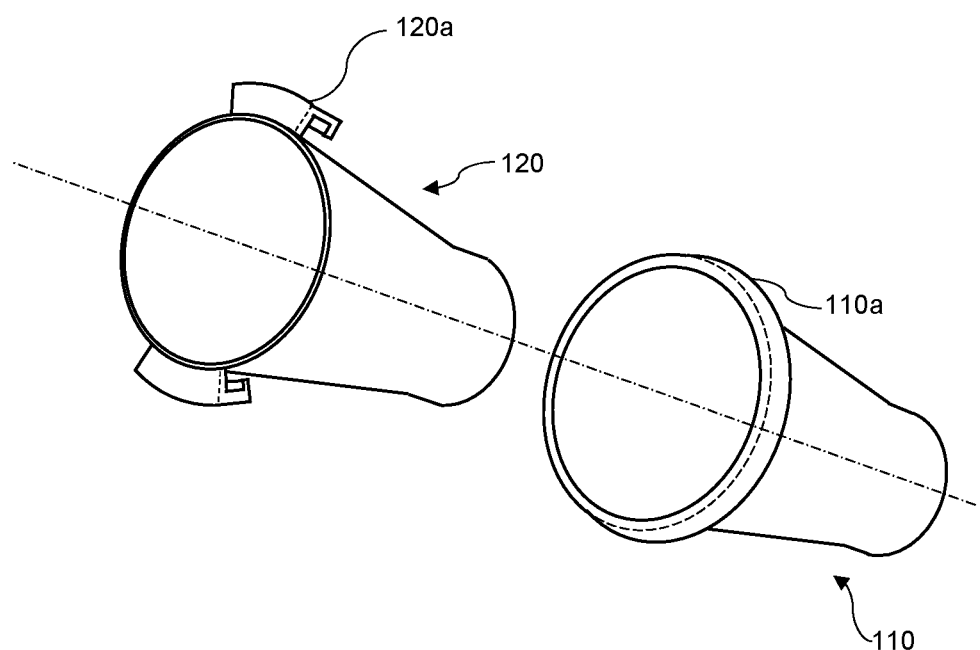
FIG. 6 illustrates an exploded perspective view of the device, in accordance with a first embodiment of the present invention.
Figures 7A, 7B:
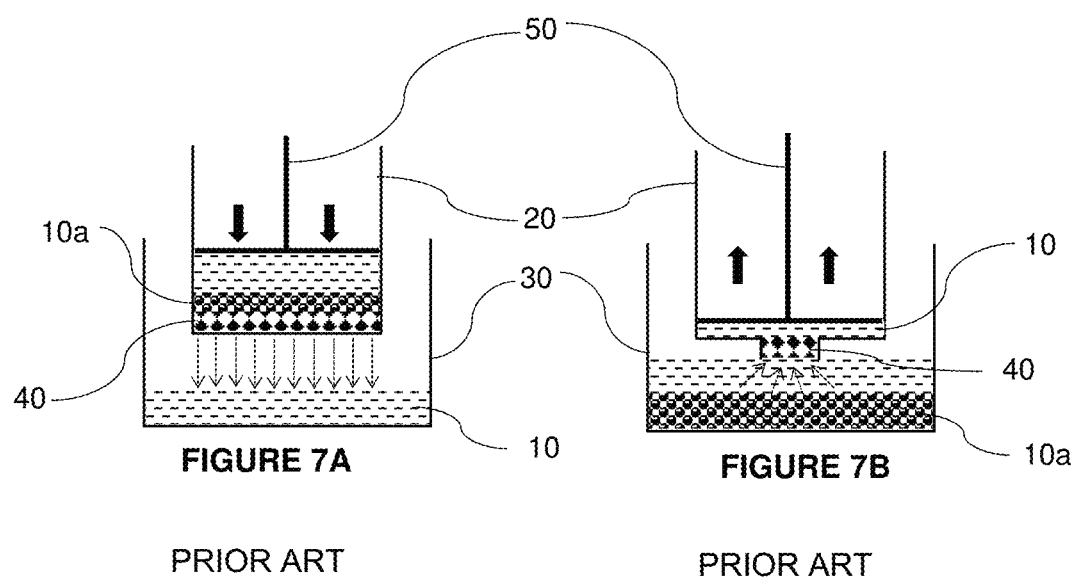
FIG. 7A illustrates a longitudinal sectional views of two different-a conventional arrangements for filtering a liquid.
FIG. 7B illustrates a longitudinal sectional view of another conventional arrangement for filtering a liquid.

Further, the first fastening part (110a) and second fastening part (120a) may also be formed as a projection around a lip portion of the container (110), and two or more inverted projections around a lip portion of the filter unit (120), respectively, as shown in FIGS. 5 and 6. The fastening parts (110a, 120a) together form a snap-fit fastener, such that the first fastening part (110a) gets locked in the second fastening part (120a) when the filter unit (120) is slid into the container (110).

Moving back to FIG. 3, the device (100) separates the liquid (10) and solid substance (10a), when the container (110) and the filter unit (120) are fastened to each other. As the container (110) and the filter unit (120) are being fastened to each other, the liquid (10) passes through the filtering medium (130) and enters the filter unit (120). Further, the solid substance (10a) is sandwiched between a bottom surface (130a, shown in FIG. 2) of the filtering medium (130) and an inner bottom surface (110c, shown in FIG. 2) of the container (110), when the container (110) and the filter unit (120) are fastened to each other. In a first embodiment, the solid substance (10a) is a powder.

The inner side surface (110b) of the container (110) and the outer side surface (120b) of the filter unit (120) are configured, such that the filter unit (120) is automatically aligned with respect to the container (110), as the filter unit (120) is being slid into the container (110). A cross section of the container (110) and the filter unit (120) can be circular, triangular, polygonal or any other shape that allows a proper alignment between the container (110) and the filter unit (120), when the filter unit (120) to be substantially slid into the container (110).

Further, the configuration of the inner side surface (110b) of the container (110) and the outer side surface (120b) of the filter unit (120) allows a portion of the outer side surface (120b) of the filter unit (120) to be frictionally, axially slid within the inner side surface (110b) of the container (110) to form an air-tight seal between the inner side surface (110b) of the container (110) and the outer side surface (120b) of the filter unit (120). For example, the inner side surface (110b) of the container (110) and/or the outer side surface (120b) of the filter unit (120) is formed with an O-ring to form a sealing contact between the inner side surface (110b) of the container (110) and/or the outer side surface (120b) of the filter unit (120).

Moreover, a negative pressure is formed between the filter unit (120) and the container (110), such that the solid substance (10a) sticking to an underside of the filtering medium (130) is forced to fall into the container (110), when the filter unit (120) is unfastened from the container (110). Thus, a process of cleaning the filtering medium (130) is simplified.

In the first embodiment, the inner side surface (110b) of the container (110) is contoured, such that an upper portion (110e, shown in FIG. 2) of the inner side surface (110b) of the container (110) is wider than a lower portion (110d, shown in FIG. 2) of the inner side surface (110b) of the container (110). An inner diameter of a lower portion (110d, shown in FIG. 2) of the container (110) is at least equal to an outer diameter of the bottom of the filter unit (110), such that the bottom of the filter unit (120) frictionally, axially slides within the inner side surface (110b) of the lower portion (110d, shown in FIG. 2) of the container (110) and forms the air-tight seal with the inner side surface (110b) of the container (110).

By this configuration, a bottom end of the filter unit (120) is substantially free to move in the upper portion (110e, shown in FIG. 2) of the container (110) and starts frictionally, axially sliding in the lower portion (110d, shown in FIG. 2) of the inner side surface (110b) of the container (110). Even though, in the above embodiments, a distance between two ends of a sidewall of the container (110) and the filter unit (120) are mentioned as inner diameter and outer diameter, respectively, it shall be understood that it also refers to a width when non-cylindrical or non-conical container and filter unit are used.

It is to be understood that the figures are only for understanding purpose and are not drawn to the scale of the actual device. In a preferred embodiment, the upper portion (110e, shown in FIG. 2) of the container (110) is conical in shape and the lower portion (110d, shown in FIG. 2) of the container (110) is cylindrical in shape, wherein:
  i. a maximum inner diameter of the conical portion is 43.263 millimeters (mm);
  ii. a minimum inner diameter of the conical portion is 33 mm;
  iii. an inner diameter of the cylindrical portion is 33 mm;
  iv. a length of the conical portion is 57.981 mm; and
  v. a length of the cylindrical portion is 17.412 mm.

Further, the filter unit (120) is formed in a shape similar to the container (110), except for an additional crown portion, wherein:
  a. a maximum outer diameter of the conical portion is 35.127 mm;
  b. a minimum outer diameter of the conical portion is 31.124 mm;
  c. an outer diameter of the cylindrical portion is 31.124 mm;
  d. an outer diameter of the crown portion is 48.5 mm;
  e. a length of the conical portion is 53.91 mm;
  f. a length of the cylindrical portion is 16.33 mm; and
  g. a length of the crown portion is 19 mm.

Further, the lower portion (110d, shown in FIG. 2) of the inner side surface (110b) of the container (110) and/or the outer side surface (120b) can be coated with a material, not reactive with the liquid (10), to avoid erosion over repeated sliding motions between the container (110) and the filter unit (120).

The complete filtering process carried out by the device (100) is as follows: The liquid (10) to be filtered is collected in the container (110), wherein the liquid (10) contains the solid substance (10a). The liquid (10) is permeable through the filtering medium (130), and the solid substance (10a) in the liquid (10) is non-permeable through the filtering medium (130).

The bottom end of the filter unit (120) is inserted into a top end of the container (110). As the outer diameter of the bottom end of filter unit (120) is at least equal to the inner diameter of the lower portion (110d, shown in FIG. 2) of the container (110), an air-tight seal is formed between the outer side surface (120b) of the filter unit (120) and the inner side surface (110b) of the lower portion (110d) of the container (110), when the bottom end of the filter unit (120) enters a top end of the lower portion (110d, shown in FIG. 2) of the container (110).

The filter unit (120) is further lowered in the container (110) by pushing the filter unit (120) or by the fastening action e.g. screwing action, so that the liquid (10) passes through the filtering medium (130), while the solid substance (10a) is pushed down towards the inner bottom surface (110c, shown in FIG. 2) of the container (110). The pushing or fastening action is continued until no further fastening is possible, so as to hold the liquid (10) in the filter unit (120) and to sandwich the solid substance (10a) between the bottom surface (130a) of the filtering medium (130) and the inner bottom surface (110c, shown in FIG. 2) of the container (110), simultaneously.

As the pressure required for filtering or separating the components (10a, 10b) in the liquid (10) is exerted by means of the fastening action, the present invention eliminates a need for any powered actuator, and therefore reducing complexity and cost of manufacturing and operating the device (10). The present invention does reverse-filtration, wherein the solid (10a) is pushed to a bottom of the container (110a) and the liquid (10) is forced to pass through the filtering medium (130) in the vertically upward direction, as shown in FIG. 3. Thus, avoiding a need for an actuator to force the filtrate, while preventing clogging of the filtering medium. Moreover, the container (110) and the filter unit (120) are fastened to each other for collecting each of the liquid (10) and the solid substance (10a) in the container (110) and the filter unit, (120), respectively, thus separating and collecting the components (10a, 10b) simultaneously without using any actuator e.g. plunger, while preventing re-mixing of the liquid (10) with the solid substances (10a).

Figure 8:
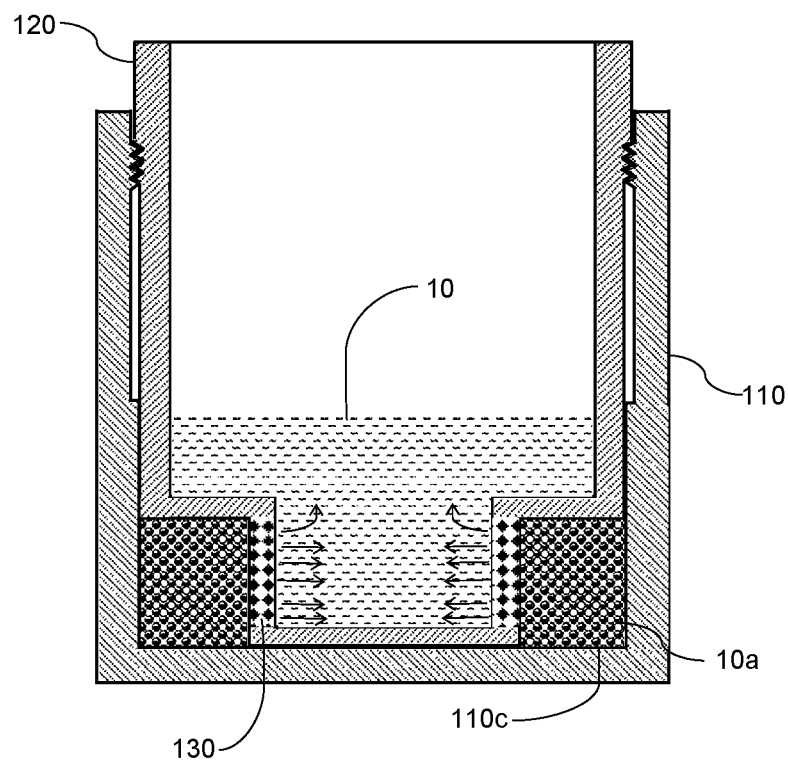
FIG. 8 illustrates a longitudinal sectional view of the device while in use, in accordance with a second embodiment of the present invention.

Even though, in the above embodiments, the filtering medium (130) is shown to be forming a bottom of the filter unit (120), it is also possible to provide the filtering medium at a side wall of the filter unit (120), as shown in FIG. 8. In this embodiment, the filtering medium (130) is embedded in the side wall of the filter unit (120) near the bottom of the filter unit (120), so that the bottom of the filter unit (120) is in contact with the inner bottom surface (110c) of the container to minimize a chance of leaving the liquid (10) held in the container (110).

Figure 9:
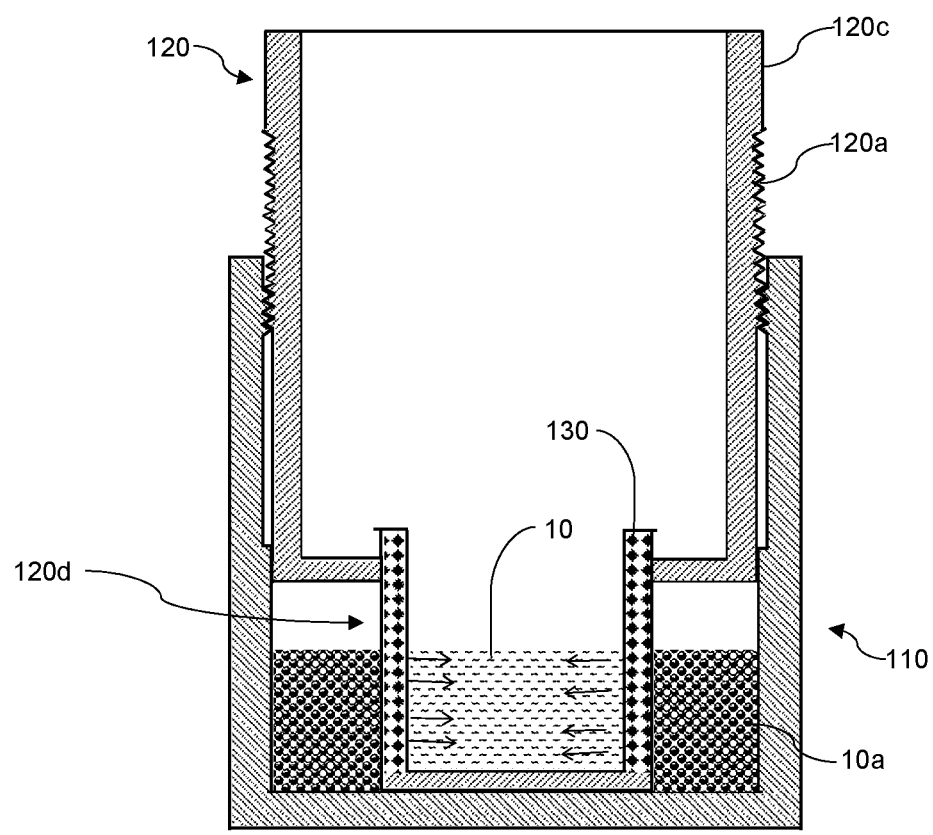
FIG. 9 illustrates a longitudinal sectional view of the device with a bottom portion of a filter unit in an extended position, in accordance with a third embodiment of the present invention.
Figure 10:
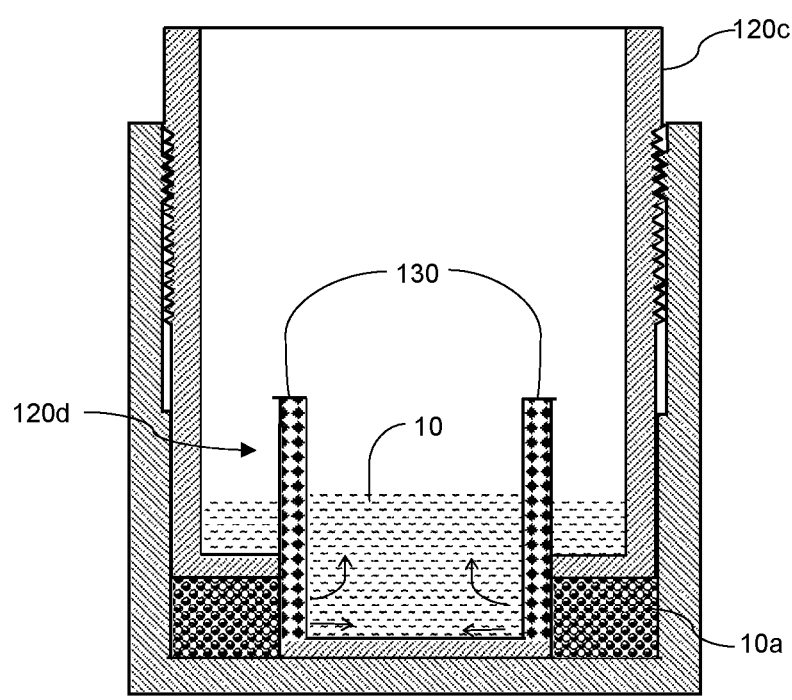
FIG. 10 illustrates a longitudinal sectional view of the device with a bottom portion of a filter unit in a collapsed position, in accordance with a third embodiment of the present invention.

FIG. 9 illustrates a longitudinal sectional view of the device, in accordance with a third embodiment of the present invention. In this embodiment, the filter unit (120) includes a top portion (120c) and a bottom portion (120d) that is axially, slidably attached to a bottom end of the top portion (120c). The bottom portion (120d) is movable between an extended position and a collapsed position (show in FIG. 10). This configuration allows complete separation of the liquid (10) and the solid substance (10a), even when an amount of the solid substance (10a) present in the liquid is unknown.

In this embodiment, a side wall of the bottom portion (120d) is embedded with the filtering medium (130), such that liquid (10) flows into the bottom portion in a direction perpendicular to the direction of gravity. Since a bottom surface of the bottom portion (120d) contacts the inner bottom surface (110c, shown in FIG. 2) of the container (110), there is no chance for the liquid (10) to get trapped between the container (110) and the filter unit (120). Further, the entire bottom portion (120d), including bottom wall and side wall of the bottom portion (120d), can be embedded with the filtering medium (130) to allow a flow of the liquid (10) from bottom as well as sides of the bottom portion (120d). By this way, it is possible to completely separate the components (10a, 10b), while preventing clogging and/or re-mixing of the components (10a, 10b).

Figure 11:
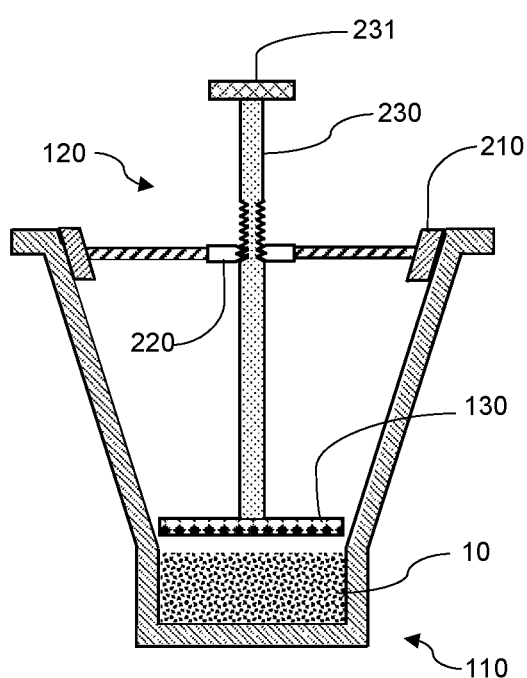
FIG. 11 illustrates a longitudinal sectional view of the device with a rod in a top position, in accordance with a fourth embodiment of the present invention.

FIG. 11 illustrates a longitudinal sectional view of the device, in accordance with a fourth embodiment of the present invention. In this embodiment, the filter unit (120) comprises an attachment part (210), a guiding part (220) and a rod (230) with a handle (231). The attachment part (210) is formed as a circular ring removably attachable with the container (110). The guiding part (220) is fixed to the attachment part (210) through one or more connectors (211), such that the guiding part (220) forms a center point of the attachment part (210). The guiding part (220) includes a hole (not shown), and the rod (230) passes through the hole.

Figure 12:
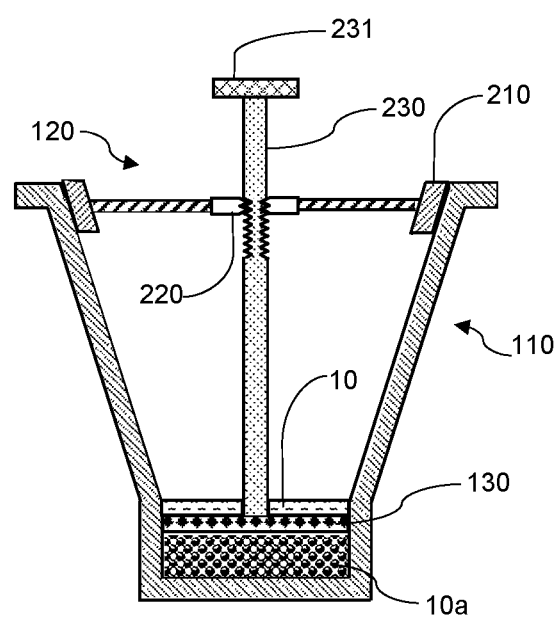
FIG. 12 illustrates a longitudinal sectional view of the device with the rod in a bottom position, in accordance with a fourth embodiment of the present invention.

The rod (230) is formed with a threading that mates with threading formed in the hole of the guiding part (220), and the rod (230) is movable between an upper position and a lower position. A top end of the rod (230) is fixed to a handle (231) and a bottom end of the rod (230) is fixed to the filtering medium (130), such that the filtering medium (130) is urged into the container (110), when the rod (230) is moved to the lower position, as shown in FIG. 12.

An edge of the filtering medium (130) is configured, such that the filtering medium (130) frictionally, axially slides over the inner side surface (110b, shown in FIG. 2) of the container (110) and forms an air-tight seal with the inner side surface (110b, shown in FIG. 2) of the container (110), when the filtering medium (130) is urged into the container (110).

Figure 13:
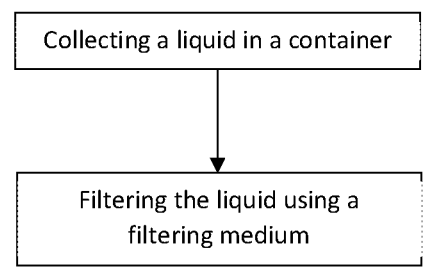
FIG. 13 shows a flow diagram of a method for filtering a liquid in accordance with an exemplary embodiment of the present invention.

In accordance with the exemplary embodiment, shown in FIG. 13, the method for filtering the liquid is explained using FIGS. 2 & 3. The method comprises the steps of: collecting the liquid (10) in the container (110), wherein the liquid (10) includes the solid substance (10a), and filtering the liquid (10) using the filtering medium (130) that is non-permeable to the solid substance (10a) in the liquid (10). For filtering, the filtering medium (130) is positioned above a top surface of the liquid (10) and is moved from the top surface towards the inner bottom surface (110c) of the container (110), such that solid substance (10a) is moved downwards and the liquid (10) passes through the filtering medium (130).

While moving the filtering medium (130) a sealing contact is formed between a peripheral edge of the filtering medium (130) and the inner side surface (110b) of the container (110). Further, the filtering medium (130) is moved towards the inner bottom surface (110c) of the container (110) until further movement is stopped by the solid substance (10a) and is locked.

As the solid substance (10a) is pushed to a bottom of the container (110), the liquid (10) is forced to pass through the filtering medium (130) in the vertically upward direction. Thus, preventing clogging of the filtering medium (130), while separating and collecting the liquid (10) and the solid substance (10a) simultaneously and preventing re-mixing of the liquid (10) with the solid substance (10a).

The terminology used herein is for the purpose of describing particular example embodiments only and is not intended to be limiting. As used herein, the singular forms "a", "an" and "the" may be intended to include the plural forms as well, unless the context clearly indicates otherwise.

The terms "comprises," "comprising," "including," and "having," are inclusive and therefore specify the presence of stated features, integers, steps, operations, elements, or components, but do not preclude the presence or addition of one or more other features, integers, steps, operations, elements, components, or groups thereof.

The use of the expression "at least" or "at least one" suggests the use of one or more elements, as the use may be in one of the embodiments to achieve one or more of the desired objects or results.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The invention claimed is:

1. A filter press for separating a mixture of liquid (10) and solid particles (10a), comprising:
   a cylindrical container (110) having an open upper portion (110e) and a closed lower portion (110d), an interior diameter of the open upper portion (110e) being greater than the interior diameter of the closed lower portion (110d), the open upper portion (110e) having a female threaded portion (110a) formed on an inner side surface (110b) of the open upper portion (110e); and
   a cylindrical filter unit (120) having:
      an elongate cylindrical wall defining a filtrate volume, the elongate cylindrical wall having an outer side surface (120b) with an outer diameter equal to the interior diameter of the closed lower portion (110d) such that the outer side surface (120b) of a bottom end of the cylindrical filter unit (120) frictionally and axially slides along the inner side surface (110b) of the closed lower portion (110d) within the cylindrical container (110) and forms a fluid-tight seal with the inner side surface (110b) of the cylindrical container (110) when the cylindrical filter unit (120) is urged into the closed lower portion (110d) of the cylindrical container (110), a male threaded portion (120a) sized and positioned to threadably engage the female threaded portion (110a) is formed on the outer side surface (120b) of the elongate cylindrical wall; and a filtering medium (130) located at the bottom end of the cylindrical filter unit (120);

wherein, the cylindrical filter unit (120) is slidably inserted into the cylindrical container (110) until the male threaded portion (120*a*) engages the female threaded portion (110*a*), then a rotational force is applied to the cylindrical filter unit (120) causing the cylindrical filter unit (120) to threadably and translationally advance into the cylindrical container (110), pressurizing the liquid (10) and forcing the liquid to pass through the filtering medium (130) and enter the filtrate volume of the cylindrical filter unit (120), while constricting the solid particles (10*a*) between the cylindrical filter unit (120) and an endwall of the closed lower portion (110*d*) of the cylindrical container (110).

2. The filter press of claim 1, wherein the filtering medium (130) is removably attached to the bottom end of the cylindrical filter unit (120).

3. The filter press of claim 1, wherein the filtering medium (130) is formed as the bottom end of the cylindrical filter unit (120).

4. The filter press of claim 1, wherein at least one marking is engraved on the inner side surface of the cylindrical filter unit (120).

* * * * *